(12) United States Patent
Rosko et al.

(10) Patent No.: US 10,955,059 B2
(45) Date of Patent: Mar. 23, 2021

(54) FAUCET INCLUDING DUAL WATER OUTLETS

(71) Applicant: Delta Faucet Company, Indianapolis, IN (US)

(72) Inventors: Michael Scot Rosko, Greenwood, IN (US); Thad J. Eads, Urbana, IN (US)

(73) Assignee: Delta Faucet Company, Indianapolis, IN (US)

( * ) Notice: Subject to any disclaimer, the term of this patent is extended or adjusted under 35 U.S.C. 154(b) by 84 days.

(21) Appl. No.: 16/276,966

(22) Filed: Feb. 15, 2019

(65) Prior Publication Data

US 2019/0264825 A1    Aug. 29, 2019

Related U.S. Application Data

(60) Provisional application No. 62/635,873, filed on Feb. 27, 2018.

(51) Int. Cl.
| | |
|---|---|
| *F16K 11/22* | (2006.01) |
| *E03C 1/04* | (2006.01) |
| *F16K 11/00* | (2006.01) |
| *E03C 1/048* | (2006.01) |

(52) U.S. Cl.
CPC .......... *F16K 11/22* (2013.01); *E03C 1/0403* (2013.01); *E03C 1/0404* (2013.01); *E03C 1/048* (2013.01); *F16K 19/006* (2013.01); *Y10T 137/9464* (2015.04)

(58) Field of Classification Search
USPC ....................................................... 801/137
See application file for complete search history.

(56) References Cited

U.S. PATENT DOCUMENTS

| | | | |
|---|---|---|---|
| 2,367,809 A | 1/1945 | Stein et al. | |
| 3,034,536 A | 5/1962 | Kennison | |
| 3,448,768 A | 6/1969 | Keller | |
| D294,631 S * | 3/1988 | Bourbon | D23/241 |
| D304,225 S * | 10/1989 | Lathrop | D23/257 |
| 4,884,596 A | 12/1989 | Byers et al. | |
| 4,889,165 A * | 12/1989 | Newcombe | E03C 1/04 137/801 |
| 4,894,874 A | 1/1990 | Wilson | |
| 4,946,135 A | 8/1990 | Yang | |

(Continued)

FOREIGN PATENT DOCUMENTS

| | | |
|---|---|---|
| CN | 201483841 | 5/2010 |
| CN | 104191520 | 12/2014 |

(Continued)

OTHER PUBLICATIONS

Bar Faucet with Angled Spout and Knurled Handle; retrieved on Mar. 7, 2018 from https://www.brizo.com/kitchen/product/61063LF-PC, 8 pgs.

(Continued)

*Primary Examiner* — Daphne M Barry
(74) *Attorney, Agent, or Firm* — Bose McKinney & Evans LLP

(57) ABSTRACT

A faucet assembly including a spout with dual flow outlets resulting in two separate streams of water from a discharge outlet that combine into a single stream a distance below the flow outlets. In an illustrative embodiment, the faucet spout is formed is formed through additive manufacturing.

22 Claims, 6 Drawing Sheets

(56) References Cited

U.S. PATENT DOCUMENTS

| | | | |
|---|---|---|---|
| 5,579,808 A | 12/1996 | Mikol et al. | |
| 6,817,379 B2 | 11/2004 | Perla | |
| 6,832,032 B2 | 12/2004 | Simmons et al. | |
| 6,926,035 B2 | 8/2005 | Ozagir | |
| 7,445,024 B2 | 11/2008 | Paterson et al. | |
| 7,766,043 B2 | 8/2010 | Thomas et al. | |
| 8,061,142 B2 | 11/2011 | Kastrup et al. | |
| 8,739,826 B2 | 6/2014 | Thomas et al. | |
| 8,820,705 B2 | 9/2014 | Davidson et al. | |
| D731,042 S | 6/2015 | Fritz | |
| D735,298 S | 7/2015 | Eads | |
| 9,096,002 B2 | 8/2015 | Seman, Sr. et al. | |
| D737,941 S | 9/2015 | Eads | |
| D751,173 S | 3/2016 | Bahler | |
| D751,667 S | 3/2016 | Bahler | |
| D757,912 S | 5/2016 | Eads | |
| D759,205 S | 6/2016 | Eads | |
| D759,212 S | 6/2016 | Eads | |
| D767,725 S | 9/2016 | Eads | |
| D769,419 S | 10/2016 | Eads | |
| 9,573,191 B2 | 2/2017 | Jagtap et al. | |
| 9,671,259 B2 | 6/2017 | Potter | |
| 9,695,579 B2 | 7/2017 | Herbert et al. | |
| D798,420 S | 9/2017 | Eads | |
| D852,326 S * | 6/2019 | McKeone | D23/242 |
| 2003/0183275 A1 | 10/2003 | Yang | |
| 2005/0103389 A1 | 5/2005 | Wei | |
| 2005/0223490 A1 | 10/2005 | Kunkel | |
| 2006/0101575 A1 | 5/2006 | Louis | |
| 2006/0117476 A1 | 6/2006 | Kunkel | |
| 2006/0118188 A1 | 6/2006 | Hsu | |
| 2006/0144442 A1 | 7/2006 | Lehner | |
| 2006/0254650 A1 | 11/2006 | Wu et al. | |
| 2006/0266424 A1 | 11/2006 | Filtness | |
| 2007/0232108 A1 | 10/2007 | Miura et al. | |
| 2008/0277927 A1 | 11/2008 | Mueller et al. | |
| 2009/0016156 A1 | 1/2009 | Wu et al. | |
| 2009/0242671 A1 | 10/2009 | Erickson et al. | |
| 2009/0266433 A1 | 10/2009 | Liang | |
| 2011/0289676 A1 | 12/2011 | Lin | |
| 2012/0067437 A1 | 3/2012 | Xia | |
| 2012/0085446 A1 | 4/2012 | Lin | |
| 2013/0019974 A1 | 1/2013 | Laera | |
| 2013/0174932 A1 | 7/2013 | Hou | |
| 2013/0340162 A1 | 12/2013 | Peel | |
| 2014/0015246 A1 | 1/2014 | Erickson et al. | |
| 2014/0130250 A1 | 5/2014 | Courtney et al. | |
| 2014/0261749 A1 * | 9/2014 | Chen | E03C 1/0404 137/78.1 |
| 2015/0308088 A1 | 10/2015 | Enlow et al. | |
| 2016/0069051 A1 | 3/2016 | McHale et al. | |
| 2016/0102682 A1 | 4/2016 | Gass | |
| 2016/0215482 A1 | 7/2016 | Fourman et al. | |
| 2016/0236212 A1 | 8/2016 | Patton et al. | |
| 2016/0243621 A1 | 8/2016 | Lucas et al. | |
| 2016/0280197 A1 | 9/2016 | Mayr et al. | |
| 2016/0340879 A1 | 11/2016 | Chen | |
| 2016/0348913 A1 | 12/2016 | Ott et al. | |
| 2017/0065147 A1 | 3/2017 | Boyer | |
| 2017/0159447 A1 | 6/2017 | Clum et al. | |
| 2017/0182503 A1 | 6/2017 | Moehring et al. | |
| 2017/0285670 A1 | 10/2017 | Pirutin | |
| 2017/0350104 A1 | 12/2017 | Clarke et al. | |
| 2017/0350516 A1 | 12/2017 | Wang et al. | |
| 2017/0356173 A1 | 12/2017 | Loberger et al. | |
| 2018/0030700 A1 | 2/2018 | Zindler et al. | |
| 2018/0135280 A1 | 5/2018 | Nagaiwa et al. | |
| 2018/0328010 A1 | 11/2018 | Faiola | |
| 2019/0055721 A1 | 2/2019 | Dieterle et al. | |
| 2019/0078305 A1 | 3/2019 | Lin et al. | |
| 2020/0048879 A1 | 2/2020 | Hadfield et al. | |
| 2020/0208383 A1 | 7/2020 | Rosko et al. | |
| 2020/0208752 A1 | 7/2020 | Rosko et al. | |

FOREIGN PATENT DOCUMENTS

| | | |
|---|---|---|
| CN | 206052880 | 3/2017 |
| CN | 206846029 | 1/2018 |
| EP | 1 342 855 | 9/2003 |
| GB | 2 145 499 | 3/1985 |
| JP | 03-204438 A | 9/1991 |
| JP | 6010382 A | 1/1994 |
| JP | 2005133481 | 5/2005 |
| JP | 3204438 | 3/2016 |
| KR | 200273548 | 4/2002 |
| WO | WO 2015/154170 | 10/2015 |
| WO | WO 2016/185484 | 11/2016 |
| WO | WO 2017/070232 | 4/2017 |

OTHER PUBLICATIONS

Chicago Faucets, Angle Stop with Integral Check; retrieved on Mar. 7, 2018, 2 pgs.

Bill McKeone, How Kallista is Changing the Rules of Design with Metal Additive Manufacturing; retrieved on Mar. 7, 2018 from https://www.3dsystems.com/kallista-direct-metal-printed-faucets, 3 pgs.

* cited by examiner

FAUCET INCLUDING DUAL WATER OUTLETS

CROSS-REFERENCE TO RELATED APPLICATION

The present application claims priority to U.S. Provisional Patent Application Ser. No. 62/635,873, filed Feb. 27, 2018, the disclosure of which is expressly incorporated herein by reference.

BACKGROUND AND SUMMARY OF THE DISCLOSURE

The present disclosure relates to faucets including spaced apart hot and cold water passageways having independent hot water and cold water outlets. More particularly, the present disclosure relates to a faucet including spaced apart hot water and cold water outlets, controlled independently by hot and cold water valves, which are angled inwardly towards each other so that hot and cold water streams from the water outlets merge to create a single mixed water stream outside of the faucet.

Faucets including multiple passageways for the delivery of water from separate valves to a spout outlet are known. In some faucets, a premixing chamber may exist where water from each valve is combined prior to being discharged from the spout outlet. In other faucets, the outlet of each passageway is located adjacent to each other, wherein water is discharged in a single stream.

Control over water temperature and flow are known performance factors for faucets. Aesthetic details of faucet components and water discharged therefrom are also factors considered in the design of faucets. With the recent availability of additive manufacturing (e.g., three dimensional printing), new and useful designs can now be created than previously possible by traditional manufacturing processes.

In an illustrative embodiment of the present disclosure, a faucet body includes a first passageway fluidly coupled to a first valve, a second passageway fluidly coupled to a second valve and sealed from the first passageway by a divider, a first flow device fluidly coupled to the first passageway, and a second flow device fluidly coupled to the second passageway, the second flow device being spaced apart from the first flow device.

According to another illustrative embodiment of the present disclosure, a faucet spout includes a hot water passageway extending between a hot water inlet and a hot water outlet, the hot water outlet including a hot water discharge axis angled relative to a vertical axis, and a cold water passageway extending between a cold water inlet and a cold water outlet, the cold water outlet including a cold water discharge axis. The cold water discharge axis is angled relative to the vertical axis toward the hot water discharge axis. The hot water passageway is fluidly sealed from the cold water passageway.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the disclosure described herein are not intended to be exhaustive or to limit the disclosure to the precise forms disclosed. Rather, the embodiments described herein enable one skilled in the art to practice the disclosure.

Figure 1:
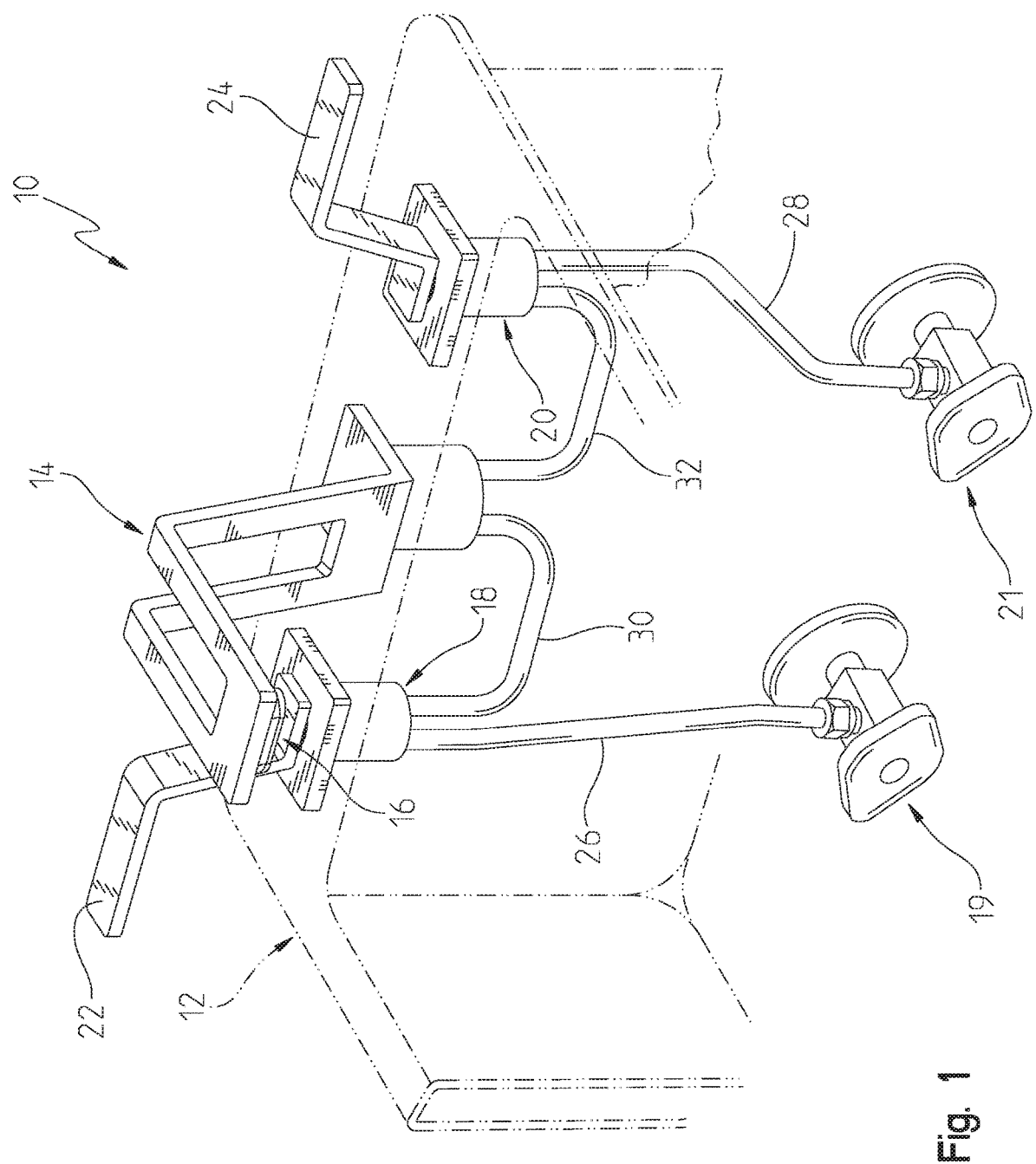
FIG. 1 is a perspective view of an illustrative faucet assembly of the present disclosure mounted to a sink deck.

Referring initially to FIG. 1, an illustrative faucet assembly 10 is shown coupled to sink deck 12. Faucet assembly 10 includes a faucet or delivery spout 14 having a discharge outlet 16. Faucet spout 14 is fluidly coupled to hot and cold water control valves 18 and 20 including handles 22 and 24, respectively. In one illustrative embodiment, hot water control valve 18 controls flow of hot water from a hot water supply 19 (illustratively, a hot water valve stop) in response to rotation of handle 22, while cold water control valve 20 controls flow of cold water from a cold water supply 21 (illustratively, a cold water valve stop) in response to rotation of handle 24. In other illustrative embodiments, control valves 18 and 20 may control other types of liquids including, for example, filtered or treated water.

With further reference to FIG. 1, control valves 18 and 20 are illustratively supported below sink deck 12 and include rotatable valve members (not shown) operably coupled to faucet handles 22 and 24 to control the flow of water through supply tubes 26 and 28 to outlet tubes 30 and 32, respectively. Illustratively, control valves 18 and 20 are fluidly coupled to faucet spout 14 through outlet tubes 30 and 32, respectively. For example, in an illustrative embodiment, control valve 18 may be fluidly coupled to faucet spout 14 through outlet tube 30, while control valve 20 is fluidly coupled to faucet spout 14 through outlet tube 32. In other words, control valve 18 may be fluidly coupled to water supply 19 through supply tube 26 and to faucet spout 14 through outlet tube 30, while control valve 20 may be fluidly coupled to water supply 21 through supply tube 28 and to faucet spout 14 through outlet tube 32.

Water control valves 18 and 20 control the flow of water between water supplies 19 and 21 and discharge outlet 16 of faucet spout 14. In the illustrative embodiment as shown in FIG. 1, the position of faucet handles 22 and 24 are shown in a position to stop the flow of water between control valves 18 and 20 and discharge outlet 16 of faucet spout 14. As faucet handles 22 and 24 are rotated relative to sink deck 12, the flow of water from control valves 18 and 20 to faucet spout 14 increases or decreases until flow reaches a peak flow or completely stops, respectively.

Figure 2:
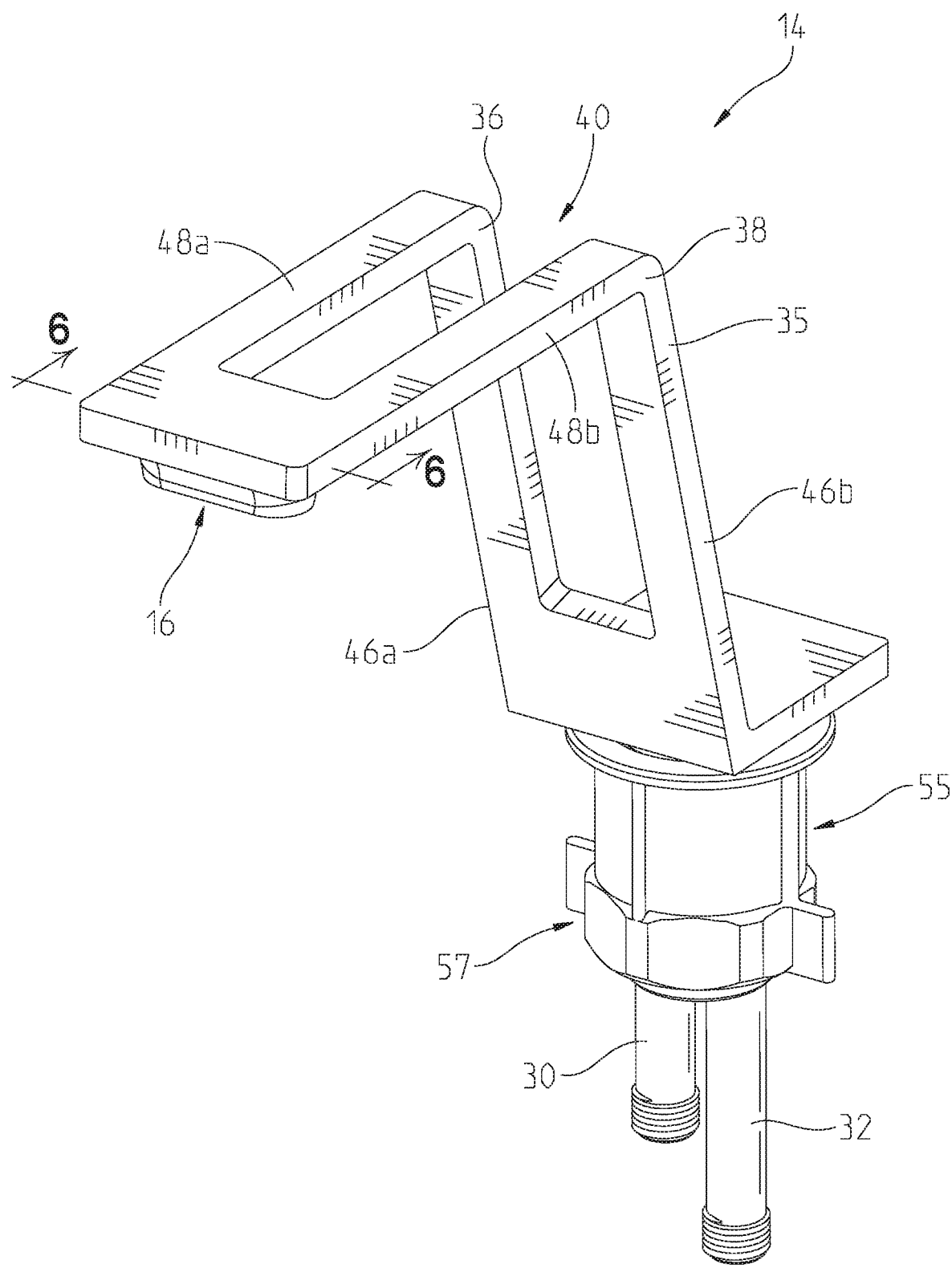
FIG. 2 is a perspective view of a faucet spout of the illustrative faucet assembly of FIG. 1.
Figure 3:
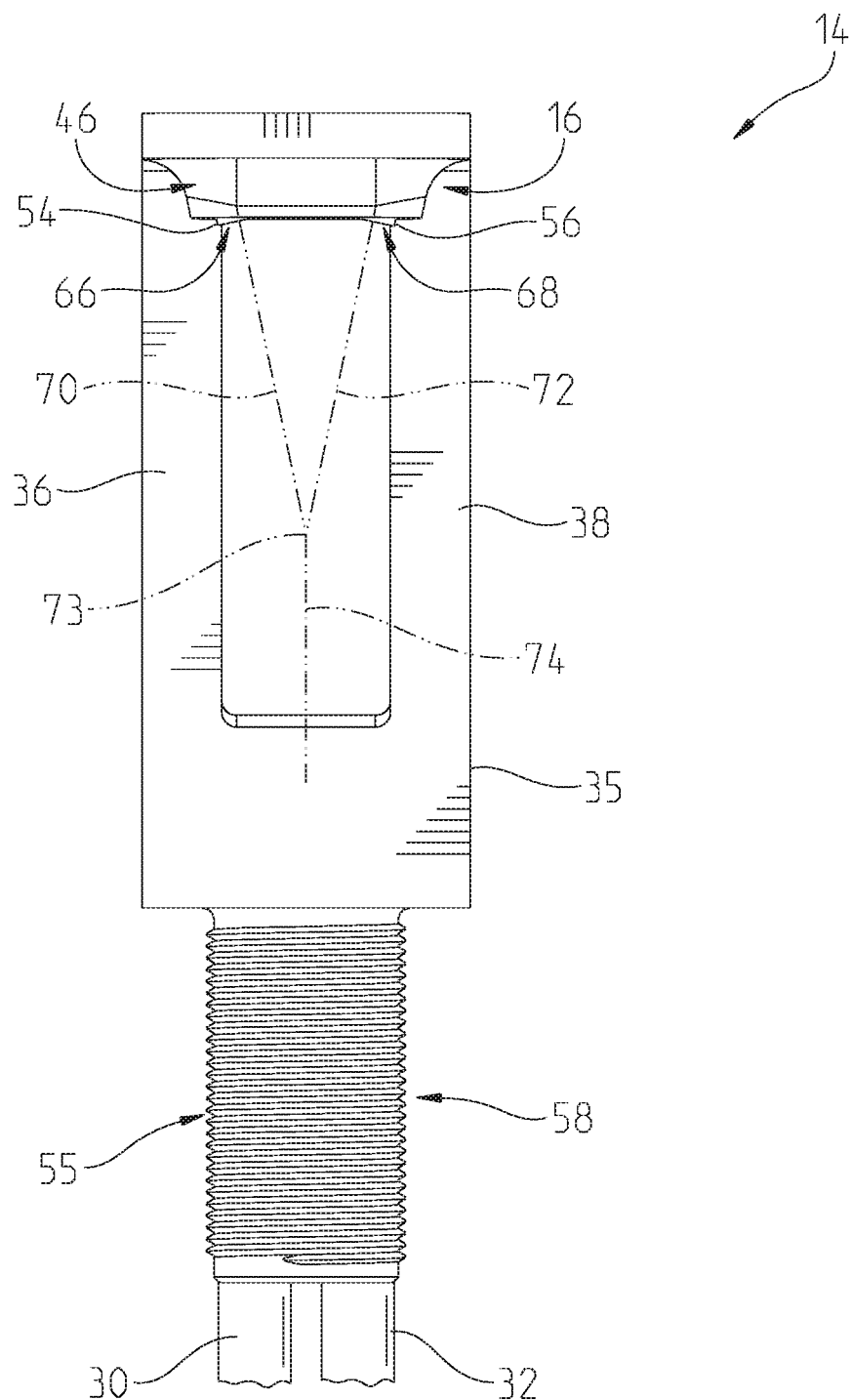
FIG. 3 is a front view of the faucet spout of FIG. 2, including water streams shown in phantom.
Figure 4:
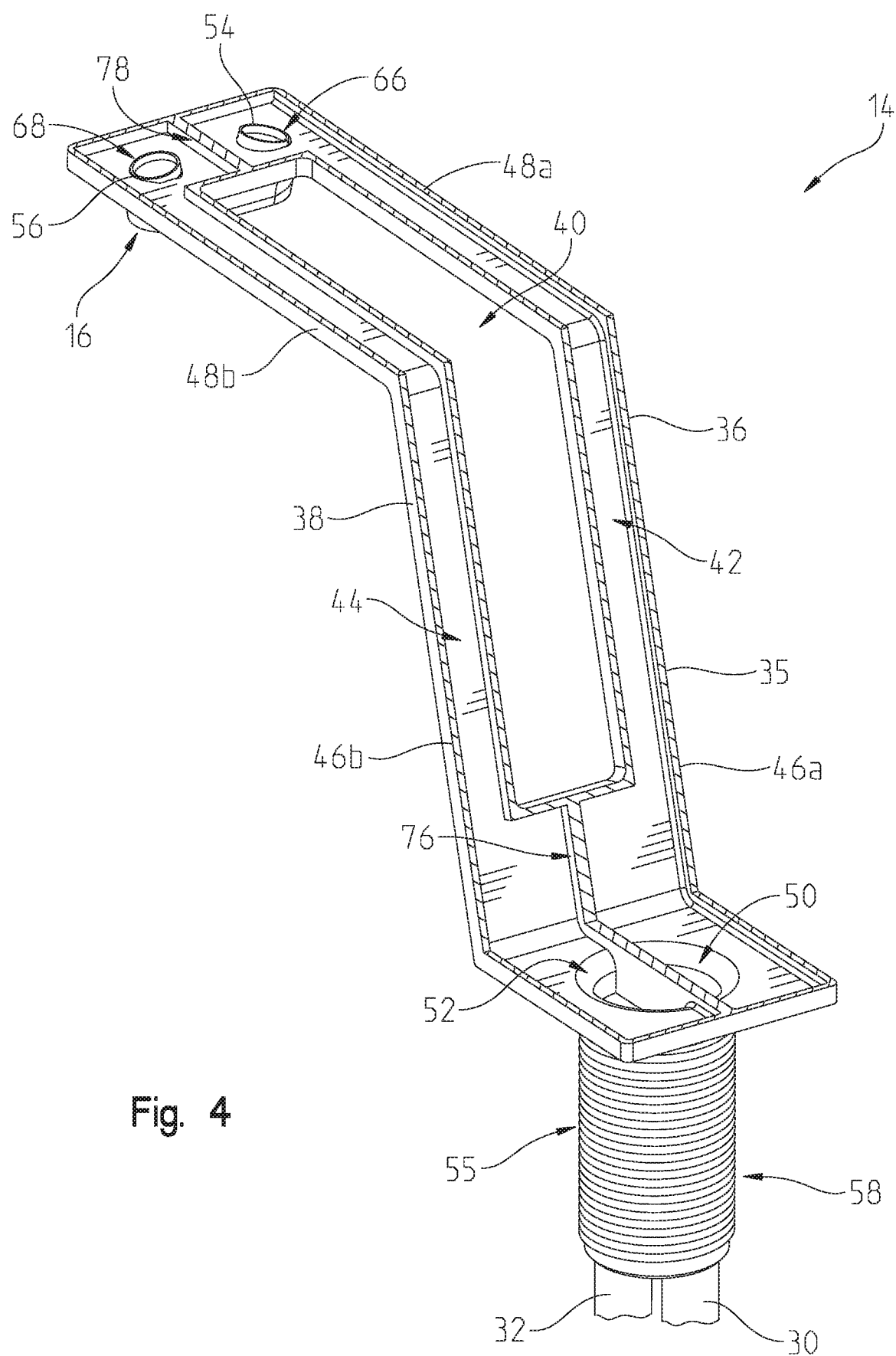
FIG. 4 is a rear perspective view in partial section, showing an illustrative internal structure of the faucet spout of FIG. 2.

Referring to FIGS. 2-4, illustrative faucet spout 14 includes a body 35 having first and second arms 36 and 38 spaced apart by an intermediate void or opening 40. First arm 36 defines a first or hot water passageway 42, and second arm 38 defines a second or cold water passageway 44. Each arm 36 and 38 illustratively includes an upwardly extending support portion 46a, 46b supporting a cantilevered portion 48a, 48b.

Figure 6:
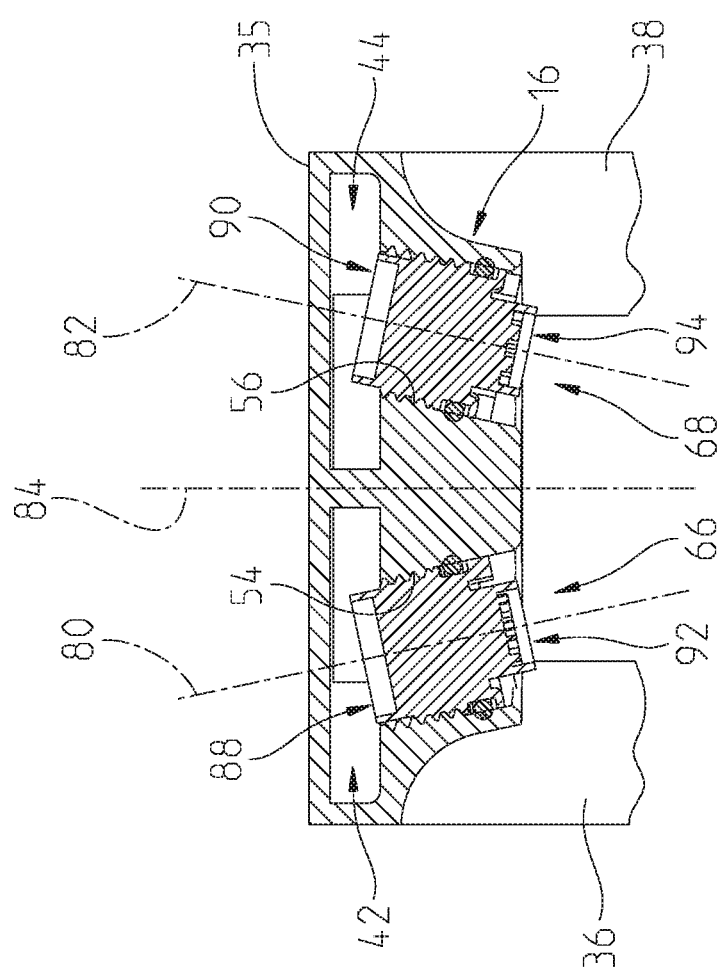
FIG. 6 is a cross-sectional view of the faucet spout taken along line 6-6 of FIG. 2.

In an illustrative embodiment, the flow of water or other liquid from outlet tube 30 enters an inlet 50 of first passageway 42 of faucet spout 14, while the flow of water or other liquid from outlet tube 32 enters an inlet 52 of second passageway 44 of faucet spout 14. The pressure of the flow or other liquid from outlet tubes 30, 32 pushes the water or other liquid through first passageway 42 and second passageway 44 to first and second outlets 54 and 56, respectively, of discharge outlet 16. FIG. 6 shows illustrative discharge outlet 16 in cross-section.

Still referring to FIG. 2, faucet spout 14 is capable of being coupled to sink deck 12 (FIG. 1) through mounting shank 55. When mounted, mounting shank 55 penetrates sink deck 12 (FIG. 1) so that outlet tubes 30, 32 extend below sink deck 12 (FIG. 1). Faucet spout 14 can be coupled to sink deck 12 via mounting nut 57 engaging threads 58 of mounting shank 55, as shown in FIGS. 2 and 3.

Referring further to FIG. 3, discharge outlet 16 comprises a spout housing or receiver 46 defining first outlet 54 and second outlet 56. Illustratively, a first flow device 66 is received in the first outlet 54, and a second flow device 68 is received in the second outlet 56. In an illustrative embodiment, the flow of water or other liquid from first passageway 42 exits first flow device 66, while the flow of water or other liquid from second passageway 44 exits second flow device 68. A discharge of water or other liquid from first flow device 66 creates a first (e.g., hot water) stream 70, while a discharge of water or other liquid from second flow device 68 creates a second (e.g., cold water) stream 72. At a convergence point 73 visibly below discharge outlet 16, first stream 70 and second stream 72 create a combined (e.g., mixed water) stream 74. In an illustrative embodiment, first stream 70 and second stream 72 combine to create combined stream 74 at a vertical distance of approximately 1 inch below first flow device 66 and second flow device 68. In alternate embodiments, first stream 70 and second stream 72 could combine at alternate vertical distances, including, but not limited to, between approximately 0.25 inches and 2.0 inches below the discharge outlet 16. While in the illustrative embodiment, first stream 70 comprises a hot water stream, and second stream 72 comprises a cold water stream, it should be appreciated that other liquids may be substituted therefor, including hot and cold water that is pre-mixed before reaching first and second outlets 54 and 56.

In an illustrative embodiment, first stream 70 is comprised of hot water while second stream 72 is comprised of cold water. By controlling the flow of water using faucet handles 22 and 24 to control valves 18 and 20, respectively, a user can control the temperature and flow rate of combined stream 74. In an illustrative embodiment, first flow device 66 and second flow device 68 are aerators, such that first stream 70 and second stream 72 are aerated streams that create combined stream 74, which is also an aerated stream. Alternately, laminar streams can be used through the use of laminar flow devices for first flow device 66 and second flow device 68. Outlets 62 and 64 may be laterally aligned to provide for the appearance of a single combine stream 74, or outlets 62 and 64 may be laterally offset such that combined stream 74 appears as two streams twisting or rotating together.

Referring to FIG. 4, an interior view of faucet spout 14 is shown as including passageways 42 and 44. Flow of water from outlet tubes 30, 32 enter first passageway 42 and second passageway 44 through passageway inlets 50 and 52, respectively. First passageway 42 and second passageway 44 are fluidly separated internally of faucet spout 14 by bottom divider 76, top divider 78, and intermediate void 40 so that the flow of hot and cold water from tubes 30, 32 do not mix until formation of combined stream 74 downstream from outlets 54 and 56 (see FIG. 3). First flow device 66 and second flow device 68 of discharge outlet 16 are each in fluid communication with only one of either first passageway 42 and second passageway 44.

Figure 5:
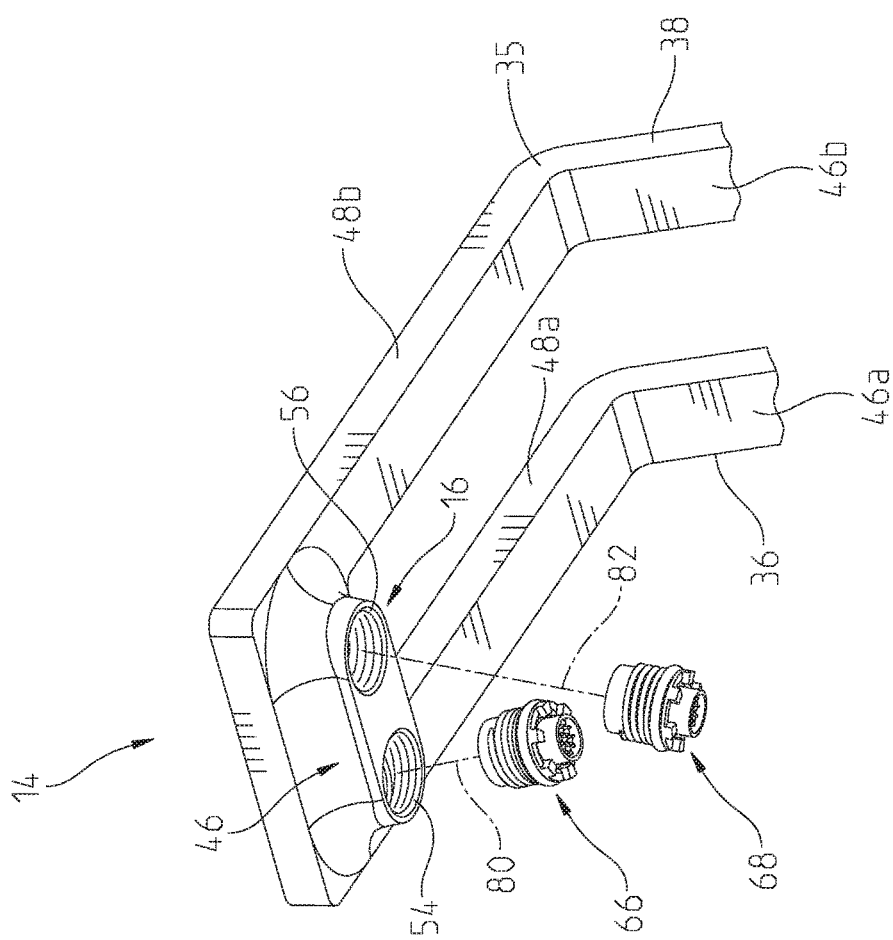
FIG. 5 is an exploded perspective view of the water outlets of the faucet spout of FIG. 2.

Referring now to FIGS. 5 and 6, first flow device 66 and second flow device 68 are illustratively coupled to spout housing 46 along outlet flow axes or water discharge axes 80 and 82, respectively. In an illustrative embodiment, first flow device 66 and second flow device 68 are each angled within spout housing 46 at an acute angle, illustratively approximately 12° relative to a vertical axis 84 of faucet spout 14 toward the other flow device. In alternative embodiments, first flow device 66 and second flow device 68 may sit within spout housing 46 at different measurements of degree relative to the vertical axis of faucet spout 14, including, for example, between 1° and 89°, and more particularly, in one embodiment between 5° and 45°, and in another embodiment between 10° and 30°.

Referring further to FIG. 6, the flow of hot water (or other liquid) from first passageway 42 enters first flow device 66 through first flow device inlet 88 and exits through first flow device outlet 92. The flow of cold water (or other liquid) from second passageway 44 enters second flow device 68 through second flow device inlet 90 and exits through second flow device outlet 94. In the illustrative embodiment, conventional aerators are used as flow devices 66 and 68. When aerators are used, the water or other liquid is aerated as it passes through the flow device 66, 68. Illustratively, the combined mixed water stream 74 feels like more water to the user even at flow rates below 1 gallon per minute (gpm). In other illustrative embodiments, other flow devices may be used, such as laminar flow devices (e.g., stream straighteners).

Illustrative faucet spout 14 may comprise various materials, such as metals plastics, combinations thereof, and the like. Illustrative faucet spout 14 may be formed using various manufacturing processes. For example, one or more components of faucet spout 14, may be formed using additive manufacturing processes (e.g., desktop fabrication or three dimensional printing). In alternate embodiments, one or more components of faucet assembly 10 may be formed using other manufacturing processes, such as casting, molding, machining, combinations thereof, and the like.

Illustratively, passageways within body 35 of faucet spout 14 may be formed using additive manufacturing processes, such as three dimensional (3D) printing. For example, three dimensional printing uses digital three dimensional models such as three dimensional scans or models created from computer-assisted design software to produce a three-dimensional object through the creation of layers by a three dimensional printer. Different illustrative three dimensional printing technologies include selective laser sintering, fused deposition modeling, direct metal laser sintering, electron beam additive manufacturing technology, and stereolithography.

Many different materials can be used to create three dimensionally printed objects, including acrylonitrile butadiene styrene plastic, polylactic acid, polyamide, glass filled polyamide, epoxy resins, silver, titanium, steel, wax, photopolymers, polycarbonate, stainless steels, INCONEL, brass, bronze, and other materials that may be powder based. Where direct metal laser sintering is used with application-suitable corrosion resistant materials, non-sintered metallic powder can be removed with a stream of pressurized fluid, and internal channels treated with acid etching or abrasive slurries. Multimedia three dimensional printing is also known, so that in some embodiments, mixed metallic-plastic items may be fabricated.

The illustrative faucet spout 14 is formed of a material acceptable for the conveyance of drinking water. In one illustrative embodiment, body 35 of faucet spout 14 may be formed of stainless steel (e.g., 316 stainless steel). In other illustrative embodiments, body 35 of faucet spout 14 may be formed of a polymer having a metal plated outer surface.

Although the invention has been described in detail with reference to certain preferred embodiments, variations and modifications exist within the spirit and scope of the invention as described and defined in the following claims.

What is claimed is:

1. A faucet spout comprising:
a monolithic body comprising a first passageway, a second passageway, and an internal divider, the first passageway fluidly coupled to a first valve, the second passageway fluidly coupled to a second valve and sealed to the first passageway by the internal divider;
a first flow device fluidly coupled to the first passageway; and
a second flow device fluidly coupled to the second passageway, the second flow device spaced apart from the first flow device.

2. The faucet spout of claim 1, wherein the first flow device and the second flow device are angled toward each other.

3. The faucet spout of claim 2, wherein the first flow device and the second flow device are each angled at 12° relative to a vertical axis.

4. The faucet spout of claim 1, wherein a first stream of liquid from the first flow device and a second stream of liquid from the second flow device combine to create a third stream of liquid at a distance from the first flow device and the second flow device.

5. The faucet spout of claim 4, wherein the third stream of liquid is created at a distance of at least one inch from the first flow device and the second flow device.

6. The faucet spout of claim 1, wherein the first passageway and the second passageway are at least partially spaced apart by an external void.

7. The faucet spout of claim 1, wherein the monolithic body is created by additive manufacturing.

8. The faucet spout of claim 1, wherein at least the first flow device is an aerator.

9. The faucet spout of claim 8, wherein the second flow device is an aerator.

10. The faucet spout of claim 1, wherein the first valve controls a flow of hot water.

11. The faucet spout of claim 10, wherein the second valve controls a flow of cold water.

12. The faucet spout of claim 1, wherein the internal divider is a bottom internal divider, and wherein the monolithic body further comprises a top internal divider, the top internal divider sealing the first passageway from the second passageway.

13. The faucet spout of claim 12, wherein the monolithic body further defines an external void sealing the first passageway from the second passageway, the external void being disposed downstream of the bottom internal divider and upstream of the top internal divider.

14. A faucet spout comprising:
a monolithic body comprising a hot water passageway, a cold water passageway, and an internal divider, and the monolithic body defining an external void between the hot water passageway and the cold water passageway;
the hot water passageway extending between a hot water inlet and a hot water outlet, the hot water outlet including a hot water discharge axis angled relative to a vertical axis;
the cold water passageway extending between a cold water inlet and a cold water outlet, the cold water outlet including a cold water discharge axis angled relative to the vertical axis toward the hot water discharge axis; and
wherein the hot water passageway is fluidly sealed from the cold water passageway by the internal divider.

15. The faucet spout of claim 14, wherein the hot water outlet and the cold water outlet are each angled at 12° relative to the vertical axis.

16. The faucet spout of claim 14, wherein a first stream of hot water from the hot water outlet and a second stream of cold water from the cold water outlet combine to create a third stream of mixed water at a distance from the hot water outlet and the cold water outlet.

17. The faucet spout of claim 16, wherein the third stream of mixed water is created at a distance of at least one inch from the hot water outlet and the cold water outlet.

18. The faucet spout of claim 14, wherein the monolithic body is created by additive manufacturing.

19. The faucet spout of claim 14, further comprising a first aerator supported by the hot water outlet, and a second aerator supported by the cold water outlet.

20. The faucet spout of claim 14, wherein the monolithic body further comprises a first arm defining the hot water passageway, and a second arm defining the cold water passageway, the first arm spaced apart from the second arm.

21. The faucet spout of claim 20, wherein the first arm includes an upwardly extending support portion and a cantilevered portion, and the second arm includes an upwardly extending portion and a cantilevered portion.

22. A faucet spout comprising:
a monolithic body comprising a first arm and a second arm, and the monolithic body defining an external void and further comprising an internal divider;
the first arm defining a hot water passageway extending between a hot water inlet and a hot water outlet, the hot water outlet including a hot water discharge axis angled relative to a vertical axis;
a first flow device fluidly coupled to the hot water passageway;
the second arm spaced apart from the first arm by the external void, the second arm defining a cold water passageway extending between a cold water inlet and a cold water outlet, the cold water outlet including a cold water discharge axis angled relative to the vertical axis toward the hot water discharge axis;
a second flow device fluidly coupled to the cold water passageway;
wherein the hot water passageway is fluidly sealed from the cold water passageway by the internal divider; and
wherein a first stream of hot water from the first flow device and a second stream of cold water from the second flow device combine to create a third stream of mixed water at a distance from the first flow device and the second flow device.

* * * * *